United States Patent [19]
Murphy

[11] Patent Number: 4,726,848
[45] Date of Patent: Feb. 23, 1988

[54] CHLORINATED HYDROCARBON PROTECTIVE AND/OR DECORATIVE COATING STRIPPING COMPOSITION AND METHOD

[75] Inventor: Donald P. Murphy, Madison Heights, Mich.

[73] Assignee: Parker Chemical Company, Madison Heights, Mich.

[21] Appl. No.: 667,078

[22] Filed: Nov. 2, 1984

Related U.S. Application Data

[63] Continuation of Ser. No. 382,846, May 27, 1982, abandoned, which is a continuation-in-part of Ser. No. 185,245, Sep. 8, 1980, abandoned.

[51] Int. Cl.$^4$ .................... C23G 1/06; C09D 9/00
[52] U.S. Cl. ................................ 134/38; 252/143; 252/144; 252/146; 252/153; 252/547; 252/165; 252/170; 252/DIG. 8
[58] Field of Search ............... 134/38; 252/143, 144, 252/146, 148, 153, 154, 164, 165, 170, 171, 547, DIG. 8, DIG. 7

[56] References Cited

U.S. PATENT DOCUMENTS

| | | | |
|---|---|---|---|
| 3,355,385 | 11/1967 | Mackley | 134/38 X |
| 3,356,614 | 12/1967 | Gilbert | 134/38 X |
| 3,538,007 | 11/1970 | Cooper et al. | 134/38 X |
| 3,574,123 | 4/1971 | Laugle | 134/38 X |
| 3,794,524 | 2/1974 | Nogueira et al. | 134/38 X |
| 3,813,309 | 5/1974 | Bakos et al. | 134/38 X |
| 3,832,235 | 8/1974 | Cooper et al. | 134/38 X |
| 4,203,872 | 5/1980 | Flanagan | 252/547 X |
| 4,231,805 | 11/1980 | Petterson et al. | 134/38 X |

*Primary Examiner*—David Sadowski
*Attorney, Agent, or Firm*—Arthur E. Kluegel

[57] ABSTRACT

Described is a composition capable of stripping protective and/or decorative coatings from a substrate comprising:

a major amount of a chlorinated hydrocarbon having from one to four carbon atoms;

a minor amount of a carboxylic acid accelerator useful for accelerating removal of the coating; and an effective amount of a penetrating nitrogen containing amine oxide surfactant.

The compositions are effective for stripping protective coatings as acrylic resins, epoxy resins, vinyl resins, polyester resins and polyurethane resins at ambient temperature.

17 Claims, No Drawings

CHLORINATED HYDROCARBON PROTECTIVE AND/OR DECORATIVE COATING STRIPPING COMPOSITION AND METHOD

This application is a continuation of application Ser. No. 382,846 filed May 27, 1982, now abandoned, which is a continuation-in-part of application Ser. No. 185,245 filed Sept. 8, 1980, now abandoned.

BACKGROUND OF THE INVENTION

The invention is concerned with compositions which are useful for removing or stripping protective and/or decorative coatings from substrates. The invention is also concerned with a method for removing said coatings.

In the manufacture of various commercial articles, it is often the practice to provide such articles with a protective and/or decorative film of a coating composition, such as a paint film, on the surface of the article. Coating compositions, such as paints, are generally construed in their normal broad terms to include a variety of film forming compositions which are applied in a variety of manners, such as spraying and dipping, and include various means of application such as with or without organic carriers, water based substances, electrostatic sprays, application using various means of energy for curing, such as heat, electron beam, infrared, UV and the like. In general, the paint or coating composition is comprised of a variety of film forming materials, including acrylic resins, epoxy resins, vinyl resins, polyester resins as alkyd resins, urethanes and the like. In addition, the substrate to which the application of the coating composition is made generally has a corrosion protective coating applied thereto, such as an iron phosphate coating composition of the Bonderite type (trademark of Oxy Metal Industries Corporation).

In the course of manufacturing the articles, it becomes desirable to remove the protective coating for a number of reasons, such as an inappropriate or inadequate coating, some defect in the substrate and the like.

Use has been made in the past of chlorinated hydrocarbon paint stripping compositions. The difficulty with many of the previous paint stripping compositions are that they may take an inordinate amount of time or require components that are undesirable from the point of view of having a detrimental effect on the personnel who would be using the stripping compositions.

Canadian Pat. No. 708,141 teaches a paint stripping composition which contains a halogenated carboxylic acid, an organic sulfonic acid in an aqueous carrier.

U.S. Pat. No. 3,544,365 teaches the use of methylene chloride compositions containing triethanol amine lauryl sulfate, anionic oil suluble surfactant, plus formic acid as a composition for removing food residues.

U.S. Pat. No. 3,356,614 teaches a trichloroethylene composition containing an activator which is a combination of acetic acid and trichloroacetic acid for film stripping purposes.

The above and other compositions used in the trade are not sufficiently efficient in removal of the coating compositions from the substrate in a sufficient period of time.

SUMMARY OF THE INVENTION

The invention is concerned with a composition capable of removing protective and/or decorative coatings from a substrate comprising:

A major amount of a chlorinated hydrocarbon of from one to four carbon atoms;

A minor amount of a carboxylic acid accelerator useful for acclerating the removal of the coating from the substrate; and an effective amount of a penetrating nitrogen containing amine oxide surfactant.

To improve the efficiency of the composition, a surfactant emulsifier of the SOX type and a corrosion inhibitor of the acetylenic alochol type may be used.

DESCRIPTION OF PREFERRED EMBODIMENT

The composition of the present invention is capable of removing a variety of films from substrates. The substrates can be any of the normal substrates encountered in industry, such as iron, example steel, such as cold rolled steel or stainless steel, or light metals, such as aluminum, titanium, and most alloys thereof. In general, the substrate that has the protective and/or decorative coating applied thereto which is to be removed is dipped into a vat containing the coating stripping composition of the present invention. This is normally performed at ambient temperature and pressure, although higher temperatures up to the boiling point of the composition could be employed. Generally no agitation is employed, although it is to be appreciated that for increased efficiency, agitation may be deemed desirable when a particularly adhesive composition is to be removed from a substrate.

In addition to the components which have been described above, other additional components are used in the coating composition to improve the overall efficiency. Such components are a combination of wax and aromatic compounds which assist in the application of the composition to the substrate and thereby assist in the removal. The wax and aromatic compound also retard evaporation of the stripping composition. Materials such as aromatic hydrocarbons, as xylene, toluene, and other alkylated aromatics may be employed. A paraffinic wax may likewise be used.

The acetylenic alcohol that is employed in the present case is one that inhibits corrosion of the substrate to which the stripping composition is to be applied. Suitable acetylenic alcohols are hexynol, ethyloctynol, ethynyl cyclohexynol, methylbutynol, methylpentynol and the like.

The acid accelerator that is useful in the present application is a carboxylic acid that is liquid at ambient and containing from one to twelve carbon atoms. A preferred carboxylic acid is a halogenated carboxylic acid, such as the chlorinated material. Suitable carboxylic acids are formic, aceitc, propionic, butyric and the like, while the halogenated acids are chloroacetic, trichloroacetic and the like. It is most preferred that a combination of the acids be employed, such as the combination of formic acid and trichloroactetic acid used in amounts of one part formic acid to one to ten parts trichloroacetic acid.

Emulsifiers of the organic SOX type may be employed such as sulfurous, sulfonic and sulfuric acids and the like, as well as the alkali salts thereof, such as sodium, potassium and the like. The SOX emulsifiers that are used are generally long chain substances containing upwards of twenty-two carbon atoms. Suitable emulsifiers of the SOX type are petroleum sulfonate, sulfates of alcohol, sulfates of ethoxylated alcohol, sulfates and sulfonates of ethoxylated alkyl phenols, sulfates of fatty esters, sulfates and sulfonates of oils and fatty acids, sulfonates of alkyl aryls, sulfonates of benzene, toluene and xylene, sulfonates of condensed napthalenes, sulfonates of dodecyl and tridecyl benzene, sulfonates of napthalene and alkyl napthalene and the like.

The penetrating nitrogen containing amine oxide surfactant is one that is useful for improving the efficiency of the stripping composition. While one does not wish to be held to any theory, it is believed that the nitrogen containing amine oxide surfactant has a tendency to penetrate the film to be removed, thereby allowing for destruction and removal of the coating composition or film from the substrate. Suitable nitrogen containing amine oxide surfactants are materials of the Aromox type (trademark of Armour Industrial Chemical Company), including dimethyl cocoamine oxide, Bis (2-hydroxyethyl) cocoamine oxide, dimethylhexadecylamine oxide, dimethyl (hydrogenated tallow) amine oxide and Bis (2-hydroxyethyl) tallowamine oxide; materials of the Alkamox type (trademark of Alkaril Chemicals) including cocoamidopropyl dimethylamine oxide and lauryl dimethylamine oxide; materials of the Aminoxide WS 35 type (trademark of Goldschmidt Products Corp.) including fatty acid amido alkyldimethylamine oxide; materials of the Ammonyx type (trademark of Onyx Chemical Co.) including cetyl dimethylamine oxide, myristylcetyl dimethylamine oxide, myristyl dimethylamine oxide and stearyl dimethylamine oxide; materials of the Varox type (trademark of Sherex Chemical Co.) includying alkyl dialkoxy amine oxides and alkyl dialkoxyether amine oxides; and the like.

Listed below is a recitation of the components of the compositions of the examples and a preferred range of the components of the composition of the present invention:

INDEX FOR TABLES I-IV

Ancor OW-1 is a trademark of Air Products for a material containing major amounts of hexynol.

Armohib 31 is an acid inhibitor useful in metal cleaning and pickling which is an aliphatic amine (trademark of Armour Industrial Chemical Company).

Petronate L is a sodium petroleum sulfonate of the anionic type (trademark of Witco Chemical Company).

Pyronate 40 is a petroleum sulfonate (trademark of Witco Chemical Company.

Tergitol 15-S-15 is a polyethylene glycol ether of linear alkyl alcohol of the non-ionic type being a paste (trademark of Union Carbide).

Surfonic LF-7 is an alkyl polyoxyalkylene ether of a non-ionic type having an HLB rating of 12 (HLB Index meaning hydrophylic lipophylic balance) (trademark of Jefferson Chemical Company Inc.).

Plurafac D-25 is modified oxyethylated straight chain alcohol of a non-ionic type with an HLB index of 11 (trademark of BASF Wyandotte).

Calsoft Las-99 is linear alkyl benzene sulfonic acid of the anionic type (trademark of Pilot Chemical Company).

Aromox DCM-W is dimethyl cocoamine oxide of the cationic type being a liquid (trademark of Armak Industrial Chemical of Armour Industrial Chemical Corporation).

Morco M-70 which is sodium petroleum sulfonate of the anionic type (trademark of Marathon Monco Company).

Tergitol TMN-10 is a trimethyl nonyl polyethylene glycol ether of the non-ionic type, HLB index of 14 (trademark of Union Carbide).

TABLE

PROTECTIVE AND/OR DECORATIVE COATING STRIPPING COMPOSITION

| Components | Range [Percent By Weight (PBW)] | Preferred Range (PBW) | Prior Art (PBW) |
|---|---|---|---|
| Methylene Chloride | at least 51 | 70 to 80 | 83.0 |
| Xylene | 1 to 10 | 2 to 4 | 2.5 |
| Wax | 0.1 to 3 | 0.5 to 1 | 0.5 |
| Calsoft Las-99 | 1 to 10 | 4 to 8 | |
| Aromox DMC-W | 0.5 to 10 | 1 to 5 | |
| Deionized Water | 1 to 20 | 5 to 15 | |
| Ancor OW-1 | 0.2 to 5 | 0.5 to 1.5 | |
| Petronate L | 1 to 10 | 1 to 3 | 2.0 |
| Pyronate 40 | 0 to 10 | 1 to 3 | |
| Formic Acid | 1 to 15 | 1 to 10 | 7.0 |
| Trichloroacetic Acid | 1 to 20 | 5 to 15 | |

The composition as used by the consumer generally has a pH of about 1.

The composition can be prepared in a number of ways. Generally, however, the first three components are mixed together and then the LAS-99 is blended thereto. Thereafter, the remaining components are added in the order they are listed in Table I.

Having described the invention above, listed below are detailed aspects thereof wherein all parts are parts by weight and temperatures are in degrees Fahrenheit unless otherwise indicated.

EXAMPLES

In the following working examples, the compositions used were to remove a cured acrylic resin film. The resins used were Duracron 200 (trademark of PPG for acrylic resin) for examples in Table II and DuPont AP-3 acrylic resin for examples in Tables III and IV. The resins were applied onto a test panel of steel having Bonderite 1000 thereon (trademark of Oxy Metal Industries for an iron phosphate conversion coating). The panels were dipped into the composition at ambient to determine the paint removal efficiency thereof.

TABLE II

| Examples | A | B | C | D | E | F | Prior Art |
|---|---|---|---|---|---|---|---|
| Methylene Chloride | 81.0 | 81.0 | 82.0 | 81.0 | 81.0 | 81.0 | 83.0 |
| Xylene | 2.5 | 2.5 | 2.5 | 2.5 | 2.5 | 2.5 | 2.5 |
| Wax | 0.5 | 0.5 | 0.5 | 0.5 | 0.5 | 0.5 | 0.5 |
| Formic Acid | 7.0 | 7.0 | 7.0 | 7.0 | 7.0 | 7.0 | 7.0 |
| Deionized Water | 2.0 | 2.0 | 2.0 | 2.0 | 2.0 | 2.0 | — |
| Armohib 31 | 1.0 | 1.0 | 1.0 | 1.0 | 1.0 | 1.0 | 1.0 |
| Petronate L | | | | | | | 2.0 |
| Tergitol 15-S-15 | | | | | | | 4.0 |
| Surfonic LF-7 | 6.0 | | | | | | |
| Plurafac D-25 | | 6.0 | | | | | |
| Calsoft Las-99 | | | 5.0 | | | | |
| Aromox DMC-W | | | | 6.0 | | | |
| Morco M-70 | | | | | 6.0 | | |
| Tergitol TMN-10 | | | | | | 6.0 | |
| Percent of film stripped | N.E. | N.E. | N.E. | 100% | 100% | 100% | 10% |
| in time (min.) | 20 min. | 20 min. | 20 min. | 13.75 min. | 28 min. | 17.5 min. | 10 min. |

TABLE III

| Examples | G | H | I |
|---|---|---|---|
| Methylene Chloride | 81.0 | 75.5 | 77.0 |
| Xylene | 2.5 | 2.5 | 2.5 |
| Wax | 0.5 | 0.5 | 0.5 |
| Calsoft Las-99 | — | 4.0 | 4.0 |
| Aromox DMC-W | 6.0 | 2.0 | 2.0 |
| Deionized Water | 2.0 | 2.0 | 1.5 |
| Armohib 31 | 1.0 | 1.0 | 1.0 |
| Petronate I | 1.0 | 2.0 | 3.5 |
| Pyonate 40 | — | 1.5 | — |
| Formic Acid | 7.0 | — | 4.0 |
| Trichloroacetic Acid | — | 9.0 | 4.0 |
| Percent of film | 100% | 100% | 100% |
| stripped in time (min.) | 13.75 min. | 10.75 min. | 7 min. |

TABLE IV

| Examples | J | K | L |
|---|---|---|---|
| Metylene Chloride | 73.5 | 73.0 | 74.5 |
| Xylene | 4.0 | 4.0 | 2.5 |
| Wax | 1.0 | 1.0 | 0.5 |
| Armohib 31 | — | — | 1.0 |
| Ancor OW-1 | — | 1.0 | — |
| Calsoft Las-99 | 5.0 | 7.0 | 4.0 |
| Aromox DMC-W | 2.0 | 2.0 | 2.0 |
| Pyronate 40 | 1.5 | — | 1.5 |
| Deionized Water | 2.0 | 2.0 | 2.0 |
| Formic Acid | 2.0 | 2.0 | 2.0 |
| Trichloroacetic Acid | 8.0 | 8.0 | 8.0 |
| Propargyl Alcohol | 1.0 | — | — |
| Petronate L | — | — | 2.0 |
| Percent of film | 100% | 100% | 100% |
| stripped in time (min.) | 6¼ min. | 4¼ min. | 9.6 min. |

N.E. represents "no effect".
The test results reflect time to remove the film of acrylic resin.

It is perfectly clear that the compositions using the penetrating nitrogen containing amine oxide substance (Aromox type) were clearly superior in their efficiency of removing the protective coating. Note that the prior art was able to remove only 10% of the acrylic film in a ten minute period of time. Note also that improved efficiency was obtained when the combination of formic acid and trichloroacetic acid was used in conjunction with the nitrogen containing amphoteric surfactant.

It should also be noted that improved stripping efficiency is obtained when the acetylenic alcohol corrosion inhibitor (Ancor OW-1) is used.

What is claimed is:

1. A liquid composition capable of removing protective and/or decorative organic polymerized film coatings from a substrate comprising:
   (a) a major amount of a chlorinated hydrocarbon of from one to four carbon atoms;
   (b) a minor amount of an acid accelerator useful for accelerating the removal of the coating, which acid accelerator is a combination of a halogenated carboxylic acid and a carboxylic acid in a weight ratio of from about 0.5 to 5:1 halogenated carboxylic acid: carboxylic acid; and
   (c) an effective amount of a penetrating nitrogen containing amine oxide surfactant selected fro the group consisting of dimethyl cocoamine oxide, Bis (2-hydroxyethyl) cocoamine oxide, dimethyl-hexadecylamine oxide, dimethyl (hydrogenated tallow) amine oxide, Bis (2-hydroxyethyl) tallowamine oxide, cocoamidopropyl dimethylamine oxide, lauryl dimethylamine oxide, fatty acid amido alkyldimethylamine oxide, cetyl dimethylamine oxide, myristylcetyl dimethylamine oxide, myristyl dimethylamine oxide, stearyl dimethylamine oxide, alkyl dialkoxy amine oxides, alykl dialkoxyether amine oxides, and mixtures thereof.

2. The composition of claim 1 wherein components (a), (b) and (c) are as follows: (a) 51 to 99 percent by weight (PBW); (b) 1 to 20 PBW; and (c) 0.5 to 15 PBW.

3. The composition of claim 2 further comprising a liquid corrosion inhibiting acetylenic alcohol of from 0.1 to 5 PBW.

4. The composition of claim 2 further comprising an organic SOX emulsifier in an amount from about 0.5 to 10 PBW.

5. The composition of claim 1 wherein the hydrocarbon is methylene chloride in an amount from about 70 to 80 PBW.

6. The composition of claim 1 further comprising an aromatic hydrocarbon in an amount from about 2 to 4 PBW.

7. The composition of claim 1 further comprising a wax in an amount from about 0.5 to 3 PBW.

8. The composition of claim 1 further comprising a linear alkyl benzene sulfonic acid of the anionic type in an amount from about 1 to 10 PBW.

9. The composition of claim 1 wherein the penetrating nitrogen containing amine oxide surfactant is a dimethyl cocoamine oxide in the liquid state in an amount from about 1 to 5 PBW.

10. The composition of claim 1 further comprising a corrosion inhibitor which is an acetylenic alcohol in an amount of about 0.5 to about 5 PBW.

11. The composition of claim 1 wherein the accelerator acid is a mixture of formic acid and trichloroacetic acid.

12. A method of removing protective and/or decorative organic polymerized film coatings from a substrate comprising placing the liquid stripping composition of claim 1 in contact with the coated substrate for a period of time sufficient to strip said coating from the substrate and removing the substrate from the stripping composition.

13. The method of claim 12 wherein the protective coating composition is selected from the group consisting of acrylic resins, epoxy resins, vinyl resins, polyester resins, polyurethane resins and mixtures thereof.

14. The method of claim 13 wherein the protective coating is an acrylic resin.

15. The method of claim 13 wherein the period of time for removing the coating ranges from about 1 to 30 minutes.

16. A composition according to claim 1 wherein the amine oxide surfactant is selected from the group consisting of dimethyl cocoamine oxide, Bis (2-hydroxyethyl) cocoamine oxide, dimethyl-hexadecylamine oxide, dimethyl (hydrogenated tallow) amine oxide, Bis (2-hydroxyethyl) tallowamine oxide, and mixtures thereof.

17. A composition according to claim 16 wherein the amine oxide surfactant is dimethyl cocoamine oxide.

* * * * *